United States Patent [19]
Burkhart et al.

[11] Patent Number: 5,708,100
[45] Date of Patent: Jan. 13, 1998

[54] EPOXY-BASED STOVING ENAMELS COMPRISING CARBOXYL-FUNCTIONAL ALKYLIDENEPOLYPHENOLS

[75] Inventors: Thomas Burkhart, Mainz; Wolfgang Hesse, Schlangenbad; Paul Oberressl, Wiesbaden, all of Germany

[73] Assignee: Vianova Resins GmbH, Mainz-Kastel, Germany

[21] Appl. No.: 650,773

[22] Filed: May 20, 1996

[30] Foreign Application Priority Data

May 22, 1995 [DE] Germany ............... 19518767.9

[51] Int. Cl.$^6$ .................. C08L 61/14; C08L 63/02; C08L 63/04
[52] U.S. Cl. ................ 525/481; 525/438; 525/488
[58] Field of Search ..................... 525/481, 488, 525/438

[56] References Cited

U.S. PATENT DOCUMENTS 5,177,161  1/1993  Graff et al. ............... 525/481

FOREIGN PATENT DOCUMENTS 01-146963  6/1989  Japan.
04-202413  7/1992  Japan.

OTHER PUBLICATIONS

CAPLUS accession No. 1991:166449 for European application No. 388913, Hoescht A.G., Sep. 1990.
Ullmann's Encyclopedia of Industrial Chemistry, "Paintings and Coatings", Fifth, Completely Revised Edition, vol. A18, pp. 359-360.
Ullmann's Encyclopedia of Industrial Chemistry, "Paintings and Coatings", Fifth, Completely Revised Edition, vol. A18, pp. 418-421.
The Chemistry of Phenolic Resins, "Epoxide Resins", Chapter 5, 1967, pp. 92-100.
P. Nylen, "Modern Surface Coatings", 1965, pp. 178-253.
W. S. Zimmt, "Coatings from Acrylic Polymers", CHEMTECH, Nov. 1981, pp. 681-683.
von William Brushwell, "Einsatz und Modifizierung von Acrylatharzen", Farbe und Lack, 86, 1980, pp. 706-710.

*Primary Examiner*—Robert E. Sellers
*Attorney, Agent, or Firm*—Foley & Lardner

[57] ABSTRACT

Stoving enamels comprising epoxy resins and carboxyl-functional alkylidenepolyphenols in a quantity such that the carboxyl groups are present at least in equimolar quantities relative to the epoxide groups of the epoxy resins are suitable for coating the inside of metallic food containers and give, on the packaging, baked coating films which are essentially free from migratable constituents carrying epoxide groups.

20 Claims, No Drawings

EPOXY-BASED STOVING ENAMELS COMPRISING CARBOXYL-FUNCTIONAL ALKYLIDENEPOLYPHENOLS

BACKGROUND OF THE INVENTION

1. Field of the Invention

The invention relates to stoving enamels based on epoxy resin and carboxyl-functional alkylidenepolyphenol, which after curing are free from migratable constituents carrying epoxide groups, to processes for their preparation and to their use, for example, for the coating of food containers.

2. Description of Related Art

It is known that phenolic resins are virtually unsurpassed by other synthetic resins in their chemical resistance, their resistance to water, solvents and corrosion, in their coloration and in their gloss (Ullmann's Encyclopedia of Industrial Chemistry, Paints and Coatings, Vol. A18 (1991) 418). Especially in the field of interior protective coatings for the finishing of metal packaging made from tinplate, aluminum, steel plate and chrome-plated steel, heat-curable phenolic resins have proved to be outstanding in combination with elasticizing resins, especially epoxy resins.

Interior protective coatings are thin barrier coats between metal packaging and contents. Their function is to protect the packaging against corrosion by the contents and, conversely, to preserve the contents against the action of metal ions and the associated impairment of taste. Substantially pore-free film formation, sufficient hardness and scratch resistance, adhesive strength and resistance to sterilization are further important properties which these interior protective coatings are required to have. Furthermore, a phenolic resin to be used in combination with an epoxy resin must be capable of reacting with the epoxide groups such that low molar mass constituents carrying epoxide groups can no longer be detected in the cured coating film and in the contents.

It is known to prepare phenol resols by reacting phenolic compounds with aldehydes (Modern Surface Coatings, P. Nylén, E. Sunderland, J. Wiley & Sons, London 1965, pages 178–189). However, these products have the disadvantage that, in combination with the epoxy resin, they are not capable of reacting completely with its epoxide groups, so that free epoxide groups or monomers of the epoxy resin used can always still be detected.

It is also known that phenolic resins which have been chemically modified with amines react by polyaddition of the amino group with the epoxide group, so that free epoxide functions can no longer be detected (The Chemistry of Phenolic Resins, J. Wiley & Sons, New York 1956). In combination with the respective epoxy resin used, however, the amine-modified phenol resols prepared by this method give coating films which owing to their cationic character are no longer resistant to sterilization.

Also known is the reaction of acrylates, especially polyhydroxy acrylates, with epoxy resins (Farbe und Lack 86 (1980) 706 and CHEMTECH 11 (1981) 681). Coating films cured with such systems, however, are unable to achieve the gold tones and gloss properties which result when phenolic resins are used. Furthermore, the flow properties of the wet films of epoxy/acrylate combinations are more difficult to establish than those of the epoxy/phenolic resin combinations.

In addition, combinations of other synthetic resins with epoxides are unable to meet all of the requirements placed on interior protective coatings for packaging (Ullmann's Encyclopedia of Industrial Chemistry, Vol. A18, Paints and Coatings, 359).

SUMMARY OF THE INVENTION

An object of the present invention, therefore, is to provide a stoving enamel, based on epoxy resin, whose wet film shows good flow properties and which, after curing, contains no migratable epoxy groups, is resistant to sterilization, and gives coating films of high gloss.

This object is achieved if carboxyl-functional alkylidenepolyphenols are used in sufficient quantity as a curing component for stoving enamels based on epoxy resin.

It is also an object of the present invention to provide methods of preparing such enamels, and method of using such enamels.

In accordance with these objectives, the invention provides stoving enamels comprising epoxy resins and carboxyl-functional alkylidenepolyphenols in a quantity such that the carboxyl groups are present at least in equimolar amount and preferably in excess relative to the epoxide groups of the epoxy resins.

There is also provided in accordance with the invention, a process for the preparation of the stoving enamels wherein epoxy resin and carboxyl-functional alkylidenepolyphenol and also, if desired, customary additives are first of all mixed, and then an acid catalyst is added to the mixture.

Also provided are methods of using the enamel, such as for coating containers, and containers so coated. Further objects, features, and advantages of the invention will become apparent from the detailed description of preferred embodiments that follows.

DETAILED DESCRIPTION OF THE PREFERRED EMBODIMENTS

Epoxy resins which can be used in the present invention are all those containing more than one epoxide group per molecule, such as 1,2-epoxide compounds. The 1,2-epoxide compounds are polyepoxides containing on average at least two epoxide groups per molecule. These epoxide compounds can be either saturated or unsaturated and may be aliphatic, cycloaliphatic, aromatic, and/or heterocyclic. They may, furthermore, contain substituents and/or functional groups which do not cause any interfering side reactions under the conditions of mixing or reaction, for example alkyl or aryl substituents, ether groups and the like. These epoxide compounds are preferably polyglycidyl ethers based on polyhydric, preferably dihydric, alcohols, phenols, hydrogenation products of these phenols and/or on novolaks (reaction products of mono- or polyhydric phenols with aldehydes, especially formaldehyde, in the presence of acidic catalysts). The epoxide equivalent weights (number-average molar mass $M_n$, divided by the number of epoxide groups $z_e$) of these epoxide compounds are preferably between 100 and 2000 g/mol, in particular between 150 and 1500 g/mol.

Examples of polyhydric phenols which can be incorporated into the epoxy resins include resorcinol, hydroquinone, 2,2-bis(4-hydroxyphenyl)propane (bisphenol A), isomer mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 2,2-bis[4-(2-hydroxypropoxy)phenyl]propane, 1,1-bis(4-hydroxyphenyl)isobutane, 2,2-bis(4-hydroxy-tert-butylphenyl)propane, bis(2- hydroxynaphthyl)methane, 1,5-dihydroxynaphthalene, tris(4-hydroxyphenyl)methane, bis(4-hydroxyphenol) ether, bis(4-hydroxyphenyl) sulfone, and the like, and the halogenation and hydrogenation products of the above-mentioned compounds. Bisphenol A is particularly preferred in this context.

Examples of polyhydric alcohols which may be incorporated into the epoxide compounds include ethylene glycol, diethylene glycol, triethylene glycol, polyethylene glycols preferably having 1 to 35 ethyleneoxy units, 1,2-propylene glyol, polypropylene glyols preferably having 1 to 15 propyleneoxy units, 1,3-propylene glycol, 1,4-butanediol, 1,5-pentanediol, 1,6-hexanediol, 1,2,6-hexanetriol, glycerol, neopentylglycol, 1,4-dimethylolcyclohexane, trimethylolethane, trimethylolpropane, and also ethoxylated and propoxylated bis-phenols, for example propoxylated bisphenol A. Polypropylene glycols, especially those with 8 to 10 propyleneoxy units, are particularly preferred in this context.

As epoxy resins it is also useful to employ polyglycidyl esters of polycarboxylic acids, which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Those preferably suitable are diglycidyl adipate, diglycidyl phthalate, and diglycidyl hexahydrophthalate.

A detailed listing of suitable epoxide compounds can be found in the handbook "Epoxidverbindungen und Epoxidharze" [Epoxide compounds and epoxy resins] by A. M. Paquin, Springer Verlag, Berlin 1958, Chapter IV and in Lee, Neville, "Handbook of Epoxy Resins", McGraw-Hill Book Co., 1967, Chapter 2. Both are hereby incorporated by reference in their entireties. The epoxide compounds mentioned can be employed individually or in a mixture.

The term carboxyl-functional alkylidenepolyphenols refers, in accordance with the invention, to alkylidene polyphenols, i.e., reaction products of mono- or polyhydric phenols and aldehydes, in particular formaldehyde, which additionally carry carboxyl groups. Preferably, the term refers to compounds resulting from the reaction of alkylidenepolyphenols with olefinically unsaturated mono- or dicarboxylic acids or anhydrides or with haloalkanoic acids. Any desired phenols and acids meeting these requirements can be used.

Alkylidenepolyphenols which can be employed are all polyphenols whose framework has been prepared from phenolic structures and oxo compounds. Examples of these include novolaks prepared by condensation from phenol and formaldehyde in the presence of acids. Low molar mass phenolic compounds, such as diphenylolmethane or 2,2-diphenylolpropane, can also be used. The phenols used to prepare the novolaks can be completely or partially alkylated. Novolaks of p- or o-alkyl- and/or arylphenols and formaldehyde can also be used, as can alkylated novolaks which have been prepared, for example, by subsequent reaction of unsubstituted novolaks with unsaturated aromatic hydrocarbons. It is also possible to use carboxylated novolaks containing unsaturated aliphatic groups.

The preferred haloalkanoic acid used is chloroacetic acid. Olefinically unsaturated acid components employed are, for example, fumaric acid and, in particular, maleic acid and/or its anhydride.

Particular preference is given to the use of those carboxylated novolaks in which the ratio of the alkylidenepolyphenol to the weight of the carboxylic acid components, especially olefinically unsaturated dicarboxylic acid or anhydride thereof, is (100−x):x, with x≦40, especially with x=10 to 20.

The carboxylated novolaks can be prepared as desired, for example, either in the melt of the alkylidenepolyphenol and of the olefinically unsaturated dicarboxylic acid or anhydride thereof, in general at between 160° and 230°, preferably between 170° and 190° C., or else by cocondensation of the formaldehydes and phenols used to prepare the carboxylated alkylidenepolyphenol with the olefinically unsaturated dicarboxylic acids or anhydrides thereof. The end point can be determined by measuring the viscosity, the melting point or the content of non-volatile constituents (residue), i.e., the quotient of initial weight and final weight in percent, in the customary manner, for example at 170° C. The amounts of epoxides and carboxylated alkylidene polyphenols are chosen such that there are at least 1 mol, preferably from 1.1 to 10 mol, more preferably from 1.2 to 5 mol, and particularly preferably from 1.3 to 4 mol, of carboxyl groups per 1 mol of epoxy groups.

The stoving enamels of the invention can in addition comprise further customary additives, for example, solvents, pigments, and/or fillers.

The invention additionally provides a process for the preparation of the epoxy resin-based stoving enamels comprising carboxyl-functional alkylidenepolyphenols. The carboxylated alkylidenepolyphenols are first of all mixed with the particular epoxy resins used such that carboxyl groups are present preferably in excess relative to epoxide groups. The weight ratio of epoxy resin to carboxyl-functional phenolic resin is preferably between 9:1 and 1:9, in particular between 8.5:1.5 and 2.0:8.0.

In addition to the carboxylated alkylidenepolyphenols and the particular epoxy resins used, natural-resin acids, especially rosin, can also be added to the stoving enamels of the invention. The natural-resin acids can also be incorporated into the novolak beforehand, for example by copolycondensation. In this context preference is given to the use of ®Albertols (natural-resin-modified phenolic resins, Hoechst AG). Further additives customary in stoving enamels can be added to this mixture.

To the resulting mixture there is subsequently added, preferably, an acid catalyst. While any desired acid catalyst can be used, phosphoric acid is especially preferred. To the stoving enamel can be added crosslinking agents, such as hexamethylenetetraamine, melamine resin, and/or phenol-resols.

The present invention additionally provides for the use of the stoving enamels for coating any desired substrates, particularly food containers, especially the insides of metal containers. The coating may be applied in any desired manner. But the stoving enamels according to the invention are generally applied by roller coating methods in the case of the coating of sheet metal and metal strips (coils) or by spray coating in the case of the coating of tubes, and are cured at elevated temperatures, i.e., temperatures of more than 120° C., preferably of between 190° and 210° C., with a stoving period of preferably from 10 to 15 minutes.

The present invention furthermore provides baked coating films on packaging which are obtained using the novel stoving enamels and are essentially free from migratable constituents carrying epoxide groups. The thicknesses of these elastic films can be controlled as desired and are preferably between 4 and 8 μm (dry film). Analysis by FT-IR spectroscopy demonstrates that the baked films are virtually free from epoxide groups.

The invention is illustrated by the following non-limiting examples. The parts and percentages used in the examples which follow are by weight unless stated otherwise.

EXAMPLE 1

1.1 Preparation of a phenol-formaldehyde novolak

The novolak is prepared in a 4-necked glass flask provided with thermostatic heating, stirrer, thermometer, feed device, reflux condenser and water separator. The water separator has a height-adjustable ascending tube which permits continuous separation of the water.

The reaction vessel is filled with 940 parts of phenol, 40 parts of xylene and 40 parts by volume of 0.5N sulfuric acid and the water separator with 86 parts of xylene. The mixture is brought to 125° C. with stirring and 616 parts of an aqueous 37% strength formaldehyde solution are added dropwise at this temperature and at a uniform rate over the course of 3 hours. Five minutes after the end of the addition of formaldehyde, 20 parts by volume of 0.5N sodium hydroxide solution are added, and the water produced is separated off to a bottom temperature of 170° C. The volatile constituents are then distilled off from the reaction mixture with rising temperature. On reaching 220° C., a vacuum of 60 mbar is applied and the mixture is maintained under vacuum at this temperature for 1 hour. The remaining flask contents comprise 913 parts of a phenol-formaldehyde novolak which contains just 0.7% of unreacted phenol. The softening point is 92° C. and the viscosity is 2050 mPa·s (23° C., 50% strength in methoxypropanol).

1.2 Reaction of the novolak from Example 1.1 with maleic anhydride 228 parts of maleic anhydride are added to the 913 parts of the novolak obtained from Example 1.1 which remained in the flask. The temperature is adjusted to 180° C. and the mixture is stirred at 180° C. for 5 hours. During this time, the residue measured in accordance with DIN 53 216 (170° C./2 hours) rises from 82.3% to 98.3%. After a reaction time of 5 hours, 1180 parts of butylglycol are added to the mixture while cooling. 2295 parts of a synthetic-resin solution are obtained, which has a residue of 51% (2 hours/170° C.) with a viscosity of 4200 mPa·s (23° C.). The acid number of the solution obtained is 72.

1.3 Preparation of a stoving enamel 60 parts of an epoxy resin based on diphenylolpropane and epichlorohydrin and having an epoxide equivalent weight of 1950 (®Beckopox EP 307, Hoechst AG) are dissolved in the same quantity of methoxypropanol, the solution is mixed with 80 parts of the resin solution from Example 1.2, and then 0.8 part of a mixture of 0.2 part ortho-phosphoric acid and 0.6 part butylglycol is added.

EXAMPLE 2

2.1 Preparation of a novolak 70 parts of phenol, 0.4 part of maleic anhydride and 13.2 parts of 30% strength aqueous formaldehyde solution are boiled under reflux for 3 hours in a reaction vessel provided with thermometer, stirrer, reflux condenser, descending condenser and a pressure-reduction device. The volatile constituents are then distilled off under reduced pressure (60 mbar) at a bottom temperature of 220° C. In the reaction vessel there remain 49.9 parts of a polymethylenepolyphenol having a viscosity of 290 mPa·s (20° C., 50% strength in ethylene glycol mono-ethyl ether).

In a different but identically equipped reactor, 309 parts of the polymethylenepolyphenol originating from 2.1 are melted, 399 parts of 33% strength sodium hydroxide solution are added, and 367.5 parts of sodium chloroacetate are added to the melt at 60° C. over the course of one hour. The reaction is left to continue at 60° C. for 7 hours, 309 parts of water and 200 parts of acetone are added, and a pH of 2.1 (23° C.) is established using 645 parts of 25% strength sulfuric acid. A further 300 g of water is added to the mixture, which has been conditioned at 60° C., and the subnatant is allowed to settle.

After separating off the subnatant, distillation is carried out to a bottom temperature of 130° C., finally at a vacuum of 60 mbar for 1 hour, in order to remove the volatile constituents. 450 parts of a light-colored, solid resin are obtained with an acid number of 289.9 for a residue of 99.6% (1 h/135° C.). The viscosity is 450 mPa·s (23° C., 50% strength in methoxypropanol). The OH number is 34 and the hydrolysis number is 311.

2.3 Preparation and testing of the coating materials 60 parts of an epoxy resin based on diphenylolpropane and epichlorohydrin, having an epoxide equivalent weight of 1950 (Beckopox EP 307, Hoechst AG), are dissolved in the same quantity of methoxypropanol, the solution is mixed with 80 parts of resin solution from Example 2.1, and then 0.8 part of a mixture of 0.2 part orthophosphoric acid and 0.6 part butylglycol is added.

3. Performance tests (coatings from Examples 1 and 2)

The comparison product used is a commercial resol which is not acid-modified: ®Phenodur PR 722, 53% strength (resol resin, Hoechst AG), with formulation to the finished coating material taking place in accordance with the specifications in 1.3 and 2.3. The formulations are shown in Table 1 below.

TABLE 1

FORMULATIONS

|  | Coating material Example 1 | Coating material Example 2 | Coating material Phenodur PR 722 |
| --- | --- | --- | --- |
| Resin from Example 1/51% | 80 |  |  |
| Resin from Example 2/51% |  | 80 |  |
| Phenodur PR 722/53% |  |  | 77 |
| Beckopox EP 307 | 60 | 60 | 60 |
| Methoxypropanol | 60 | 60 | 60 |
| $H_3PO_4$, 20% butylglycol | 0.8 | 0.8 | 0.8 |
|  | 200.8 | 200.8 | 197.9 |

The coating materials are applied to commercial tin plate using a spiral doctor blade so as to give a mean coating weight, after baking, of 5 g/m².

The coating films are baked in a convection oven for 12 minutes at 200° C.

The physical tests are carried out on the cooled, coated metal panels. The results are shown in Table 2 below.

The comparison between the Phenodur coating and the coating materials of Examples 1 and 2, according to the invention, clearly reveals the advantages offered by this invention, especially with regard to adhesion, Erichsen cupping and resistance to sterilization in lactic acid.

Other embodiments of the invention will be apparent to those skilled in the art from consideration of the specification and practice of the invention disclosed herein. It is intended that the specification be considered as exemplary only, with the true scope and spirit of the invention being indicated by the claims which follow.

TABLE 2

TESTS AND RESULTS

|  | Coating material Example 1 | Coating material Example 2 | Coating material Phenodur PR 722 |
|---|---|---|---|
| Dry film thickness [μm] | 5 | 5 | 5 |
| Color | dark gold | dark gold | light gold |
| Impact indentation ASTM D 2794, 32i*p | pass | pass | pass |
| Adhesion, crosshatch ISO 2409 | Gt 0 | Gt 0 | Gt 0–1 |
| Impact bend test | 70% satisfactory | 67% satisfactory | 55% satisfactory |
| Erichsen cupping machine BA 143/224/II/D-2 | | | |
| First draw, edge | 0% destroyed | 0% destroyed | 0% destroyed |
| Second draw, edge | 0% destroyed | 0% destroyed | 5% destroyed |
| Third draw, edge | 5% destroyed | 5% destroyed | 25% destroyed |
| Sterilization in 2% lactic acid 1 h/129° C. | | | |
| First draw, edge | 0% destroyed | 0% destroyed | 5% destroyed |
| Second draw, edge | 5% destroyed | 0% destroyed | 25% destroyed |
| Third draw, edge | 10% destroyed | 10% destroyed | 45% destroyed |
| Metal strip and beading | satisfactory, no blushing | satisfactory, no blushing | satisfactory, slight blushing |
| Adhesion, crosshatch ISO 2409 | Gt 0 | Gt 0 | Gt 2 |

What is claimed is:

1. A stoving enamel consisting essentially of one or more epoxy resins containing more than one epoxide group per molecule and one or more carboxyl-functional novolaks which are reaction products of a novolak and one or more acids selected from the group consisting of olefinically unsaturated mono- and dicarboxylic acids, anhydrides of the mono- and dicarboxyclic acids, and haloalkanoic acids, in a quantity such that the carboxyl groups are present in at least an equimolar quantity relative to the epoxide groups of the epoxy resins, and the enamel optionally comprising a natural-resin acid.

2. A stoving enamel as claimed in claim 1, wherein the carboxyl-functional novolak comprise a reaction product of one or more novolaks with one or more halocarboxylic acids.

3. A stoving enamel as claimed in claim 1, wherein the carboxyl-functional novolak comprise a reaction product of one or more novolaks with one or more olefinically unsaturated dicarboxylic acids or their anhydrides.

4. A stoving enamel as claimed in claim 1, wherein the carboxyl-functional novolak comprise a reaction product of one or more novolaks, one or more natural-resin acids, and one or more olefinically unsaturated dicarboxylic acids or their anhydrides.

5. A process for the preparation of a stoving enamel as claimed in claim 1, comprising mixing the epoxy resin and carboxyl-functional novolak and then adding an acid catalyst to the mixture.

6. A process as claimed in claim 5, wherein the weight ratio of epoxy resin to carboxyl-functional novolak is from 8.5:1 to 1:4.

7. A process as claimed in claim 5, wherein the acid catalyst comprises phosphoric acid.

8. A method of using the stoving enamel as claimed in claim 1, which comprises coating a food container with the stoving enamel.

9. A method of using the stoving enamel as claimed in claim 1, which comprises coating the inside surface of a metal container with the stoving enamel.

10. A method of using the stoving enamel as claimed in claim 1, Which comprises forming a baked coating film on packaging, which is essentially free from migratable constituents carrying epoxide groups, wherein the coating film comprises the stoving enamel.

11. A stoving enamel as claimed in claim 2, wherein the halocarboxylic acid comprises chloroacetic acid.

12. A stoving enamel as claimed in claim 3, wherein the olefinically unsaturated dicarboxylic and/or anhydride comprises fumaric acid, maleic acid, or maleic acid anhydride.

13. A stoving enamel as claimed in claim 1; wherein the ratio of the novolak to the weight of the carboxylic acid components is (100–x):x, wherein x≦40.

14. A stoving enamel as claimed in claim 13, wherein x is from 10 to 20.

15. A stoving enamel as claimed in claim 1, wherein the carboxyl-functionality is provided by fumaric acid, maleic acid, or maleic acid anhydride.

16. A stoving enamel as claimed in claim 1, which further comprises rosin as the natural-resin acid.

17. A product formed by curing the stoving enamel of claim 1.

18. A stoving enamel as claimed in claim 1, wherein the epoxy resin has an epoxide equivalent weight of 100 to 2000 g/mol.

19. A stoving enamel as claimed in claim 1, wherein there is from 1.1 to 10 mol of carboxylic group in the carboxy-functional novolak per mol of epoxide groups in the epoxy resin.

20. A product of claim 17, which is free from migratable constituents carrying epoxy groups.

* * * * *